US011470677B2

(12) United States Patent
Rodriguez

(10) Patent No.: US 11,470,677 B2
(45) Date of Patent: Oct. 11, 2022

(54) SYSTEMS AND METHODS FOR A COMPUTER NETWORK INTERMEDIATE ROUTER

(71) Applicant: DISH Network L.L.C., Englewood, CO (US)

(72) Inventor: Raymond C. Rodriguez, Denver, CO (US)

(73) Assignee: DISH NETWORK L.L.C., Englewood, CO (US)

( * ) Notice: Subject to any disclaimer, the term of this patent is extended or adjusted under 35 U.S.C. 154(b) by 30 days.

(21) Appl. No.: 17/004,813

(22) Filed: Aug. 27, 2020

(65) Prior Publication Data

US 2022/0070961 A1    Mar. 3, 2022

(51) Int. Cl.
G06F 15/16     (2006.01)
H04W 76/25    (2018.01)
H04W 88/18    (2009.01)

(52) U.S. Cl.
CPC ......... *H04W 76/25* (2018.02); *H04W 88/182* (2013.01)

(58) Field of Classification Search
CPC ..... H04W 76/25; H04W 88/182; H04W 8/22; H04W 76/00; H04W 24/04
See application file for complete search history.

(56) References Cited

U.S. PATENT DOCUMENTS

2011/0032865 A1*   2/2011   Richardson ......... H04L 12/2856
                                                                 370/316
2017/0251515 A1*   8/2017   Altman ............... H04L 61/2503
(Continued)

FOREIGN PATENT DOCUMENTS

WO    2020/165278 A1    8/2020

OTHER PUBLICATIONS

International Search Report and Written Opinion for International Application No. PCT/US2021/047795, dated Dec. 14, 2021, 18 pages.

(Continued)

*Primary Examiner* — John B Walsh
(74) *Attorney, Agent, or Firm* — Jeremiah J. Baunach; VLP Law Group, LLP

(57) ABSTRACT

A network router provides Internet connectivity to an intermediate router (e.g., implemented on a computer, smartphone or other device), which in turn provides Internet connectivity to a plurality of devices (e.g., IoT devices). During migration to a new router, the intermediate router may receive an indication that the first wireless router is out of service or no longer exists. Despite that the first wireless router is out of service or no longer exists, the intermediate router keeps each network connection from a plurality of devices to the intermediate router in a manner that is unaffected by the first wireless router being down or no longer existing (other than the plurality of devices experiencing a temporary Internet service interruption). The intermediate router then connects to a second wireless router to replace the first wireless router that is out of service or no longer exists. The intermediate router provides, via the connection to the new second wireless router, Internet connectivity to the plurality of devices connected to the intermediate router without reconnection, reactivation or reconfiguration of the plurality of devices to obtain the Internet connectivity.

7 Claims, 5 Drawing Sheets

(56) References Cited

U.S. PATENT DOCUMENTS

2020/0260519 A1    8/2020  Jeon et al.
2020/0344146 A1*  10/2020  Roberts .................. H04L 41/08

OTHER PUBLICATIONS

LE Electronics Inc., "Summary of [103#53] [IAB] E2E reliability in hop-by-hop RLC ARQ," 3GPP TSG-RAN WG2 #103bis, R2-1815349, Oct. 8-12, 2018, 24 pages.
ZTE, "Discussion on IAB BH RLF handling," 3GPP TSG-RAN WG2#109 electronic, R2-2000509, Feb. 24-Mar. 6, 2020, 6 pages.

* cited by examiner

SYSTEMS AND METHODS FOR A COMPUTER NETWORK INTERMEDIATE ROUTER

TECHNICAL FIELD

The technical field relates to computer networks, and more particularly, systems and methods for a computer network intermediate router.

BRIEF SUMMARY

The term Internet of Things (IoT) encompasses everything connected to the internet, and is increasingly being used to define objects that "talk" to each other. The IoT is made up of devices, from simple sensors to smartphones and wearables, connected together and is currently in its infancy. Those who have purchased one of the myriad smart home products, from lightbulbs, switches, to motion sensors, have experienced issues such as the devices not easily connecting to each other, difficulty in configuration and connecting to new network equipment, and significant security problems that need to be addressed. For example, each device may need to be individually configured and connected to an on-premises wireless router during initial installation. When the user needs to migrate to a new router, or otherwise switch or replace the router, each device needs to again be individually reconfigured, reactivated and reconnected to the new router. This is requires additional time and technical knowledge that a user may not have.

To solve the above technical problem, a first wireless router provides Internet connectivity to an intermediate router (e.g., implemented on a computer, smartphone or other device), which in turn provides Internet connectivity to a plurality of devices (e.g., IoT devices). The intermediate router may receive an indication that the first wireless router is out of service or no longer exists. Despite that the first wireless router is out of service or no longer exists, the intermediate router keeps each network connection from the plurality of devices to the intermediate router in a manner that is unaffected by the first wireless router being down or no longer existing (other than the plurality of devices experiencing a temporary Internet service interruption). The intermediate router then connects to a second wireless router to replace the first wireless router that is out of service or no longer exists. The intermediate router provides, via the connection to the new second wireless router, Internet connectivity to the plurality of devices connected to the intermediate router without reconnection, reactivation or reconfiguration of the plurality of devices to obtain the Internet connectivity.

BRIEF DESCRIPTION OF THE DRAWINGS

The components in the drawings are not necessarily to scale relative to each other. Like reference numerals designate corresponding parts throughout the several views.

The components in the drawings are not necessarily to scale relative to each other. Like reference numerals designate corresponding parts throughout the several views.

DETAILED DESCRIPTION

Figure 1:
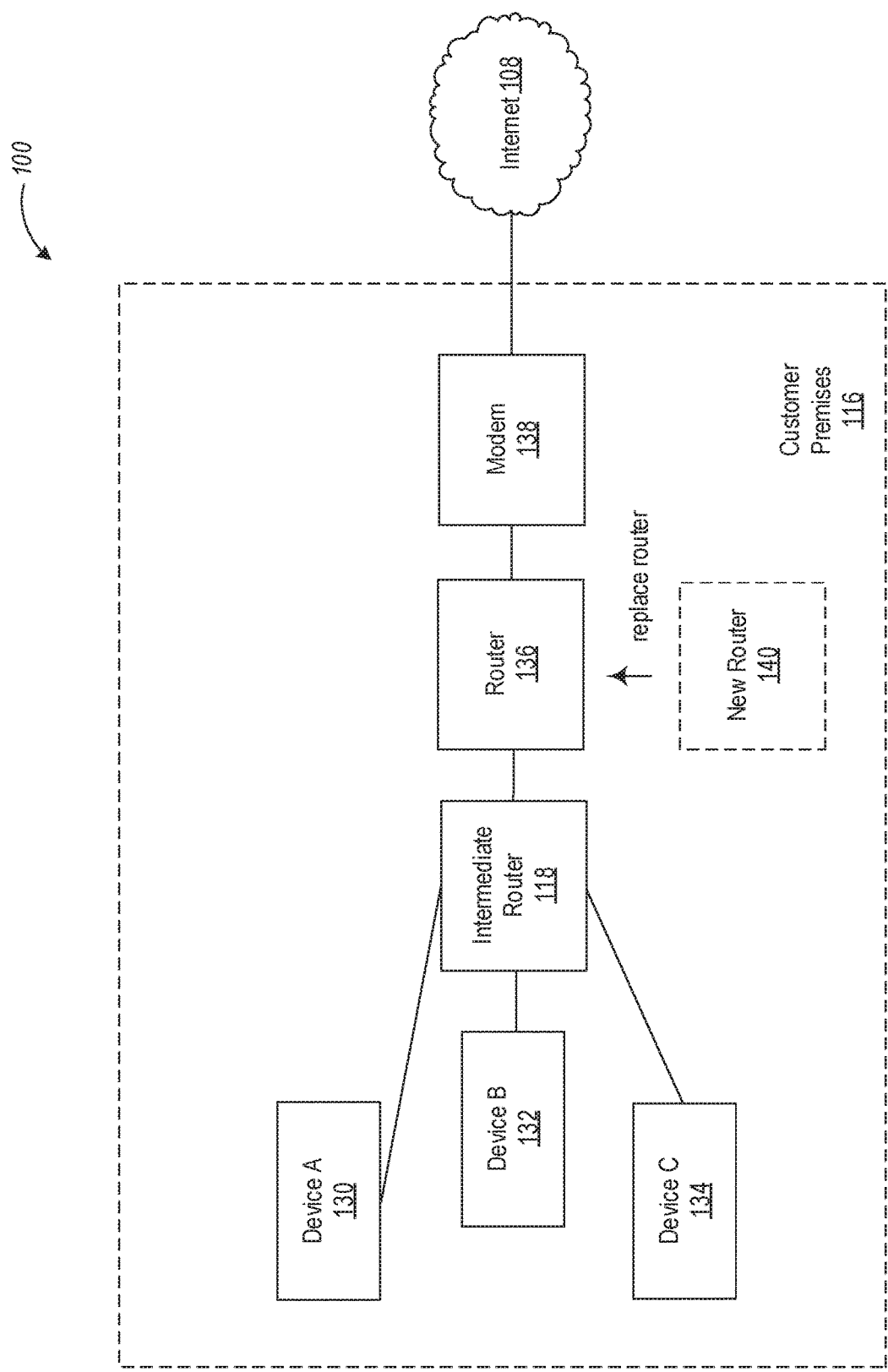
FIG. 1 is a block diagram illustrating an example environment in which various embodiments of systems and methods for a computer network intermediate router may be implemented, according to one non-limiting embodiment.

FIG. 1 is a block diagram illustrating an example environment in which various embodiments of systems and methods for a computer network intermediate router 118 may be implemented, according to one non-limiting embodiment.

It is to be appreciated that FIG. 1 illustrates just one example of a customer premises 116 environment and that the various embodiments discussed herein are not limited to use of such systems. Customer premises 116 can include a variety of communication systems and can use a variety of devices, including computers, peripheral devices, communication devices, media devices, mobile devices, home entertainment systems, receiving devices, home automation devices, home security devices and home appliances. All or some of such devices are represented by device A 130, device B 132 and device C 134, and may be network addressable and in operable communication with each other and/or other devices over various networks, such as the Internet 108, via modem 138, router 136 and intermediate router 118. For example, router 136 may be a wireless router that connects directly to modem 138 by a cable. This allows router 136 to receive information from, and transmit information to, the Internet 108. The router 136 then creates and communicates with a local area network (LAN), such as a Wi-Fi (IEEE 802.11) network of the customer premises 116, which may include device A 130, device B 132, device C 134, intermediate router 118, mesh network(s), other LANs or networks, etc., using built-in antennas. As a result, device A 130, device B 132 and device C 134 and intermediate router 118 all have access to the Internet 108. The intermediate router 118 may manage network communications from and to device A 130, device B 132 and device C 134, including routing network communication between such devices, mesh network devices, and routing network communication being sent to and from such devices over a local network and/or over the Internet 108 via router 136 and modem 138.

Devices as described above which may be connected to intermediate router 118, such as device A 130, device B 132 and/or device C 134, may include, but are not limited to: computing devices, smart phones, tablets, cameras, smart home devices, motion sensors, light sensors, other sensors, locks, lights, thermostats, security devices, entertainment systems, devices that provide media by satellite, cable and/or Internet streaming services, home automation devices, appliances, gaming devices, toys, wearable devices, watches, televisions, other IoT devices, mesh network devices, nodes, etc. Furthermore, home automation service providers, such as, but not limited to, home security service and data service providers, provide their customers a multitude of home automation and/or security services. Such services may include remote monitoring of various home automation devices over telecommunication channels, the Internet 108 or other communication channels and may also include providing equipment and installation of equipment for the service provider and/or user to configure, manage and control the devices. According to one embodiment, an example of such equipment is the intermediate router 118. Examples of such home automation devices may include, but are not limited to, one or more of, or any combination of: a camera, a thermostat, a light fixture, a door sensor, a window sensor, a power outlet, a light switch, a doorbell, a doorbell sensor, a light bulb, a motion sensor, an electrical switch, an appliance switch, a window covering control device, an alarm, a dimmer switch and a door lock. Such devices as described above, for example, are represented by device A 130, device B 132 and/or device C 134. In various embodiments, there may be additional or fewer devices than that shown in FIG. 1. Also, in some embodiments, the functionality of router 136 and modem 138 may be combined into one device.

Monitoring and control of device A 130, device B 132 and/or device C 134, and other network services, may be provided by use of the intermediate router 118 which is communicatively coupled to Internet router 136 that provides access to the Internet 108 via modem 138. Intermediate router 118 interconnects wirelessly to one or more devices represented by device A 130, device B 132 and/or device C 134. In some embodiments, there may be a wired connection to a plurality of such devices via intermediate router 118. Intermediate router 118 may receive various commands input by a user on the customer premises 116 and/or from a remote monitoring system over the Internet 108, such as from a home automation service provider, home security service, satellite television service provider, cable TV service provider or other data service provider. These commands control the functions of intermediate router 118 which in turn configures, controls and manages all inbound and outbound network communications of device A 130, device B 132 and/or device C 134.

According to one embodiment, intermediate router 118 provides a service to manage migration from one Internet router, such as router 136 to another Internet router, such as new router 140. The intermediate router 118 provides Internet connectivity to device A 130, device B 132 and device C 134 after the migration to the new router 140 replacing router 136 without reconnection, reactivation or reconfiguration of those devices during the migration. For example, despite that router 136 may become out of service during the migration, the intermediate router 118 keeps each network connection from device A 130, device B 132 and device C 134 to the intermediate router 118 in a manner that is unaffected by router 136 being down or no longer existing, other than device A 130, device B 132 and device C 134 experiencing a temporary Internet service interruption until the new router 140 is in place. In one example embodiment, this is due to the fact that device A 130, device B 132 and device C 134 are all communicating on a separate network created by intermediate router 118, which handles all Internet communications, including, for example, Hyper Text Transfer Protocol (HTTP) over Transmission Control Protocol/Internet Protocol (TCP/IP) packets, to and from device A 130, device B 132 and device C 134.

In one embodiment, intermediate router 118 creates a separate wireless network including device A 130, device B 132 and device C 134 and the Internet Gateway of intermediate router 118 is set to the IP address of router 136. Thus, device A 130, device B 132 and device C 134 may remain activated and configured to be connected to intermediate router 118, even during migration of router 136 to a new router 140. The migration to new router 140 may include merely updating the Internet Gateway of intermediate router 118 to the IP address of the new router 140, rather than individually reconnecting, reactivating and reconfiguring device A 130, device B 132 and device C 134 to connect to new router 140. Device A 130, device B 132 and device C 134 continue to communicate with intermediate router 118 on a separate local area network created by intermediate router 118 and do not need to know any network information or other configuration information about the new router 140 before, during and after migration to the new router 140 replacing router 136. This results from device A 130, device B 132 and device C 134 also not needing to know any network information or other configuration information about the previous router 136 due to their previous connection to the Internet via the same intermediate router 118. Such network management, security and other functions may be performed based on a set of conditions or rules implemented and/or stored by the intermediate router 118 and/or remote monitoring system.

In some embodiments, the connection provided by intermediate router 118 between the intermediate router 118 and device A 130, device B 132 and device C, includes a wireless connection. This wireless connection may, for example, be a ZigBee® network connection based on the IEEE 802.15.4 specification, a Z-Wave® connection, a Wi-Fi connection based on the IEEE 802.11 specifications or a Bluetooth® connection, or another wireless connection based on protocols for communication among devices used for home automation, including those that use radio frequency (RF) for signaling and control. In some embodiments, different devices may have different types of wireless connections to the intermediate router 118. Often, such wireless connections involve a network pairing between the intermediate router 118 and the various devices, such as device A 130, device B 132 and device C. The connection provided by intermediate router 118 between intermediate router 118 and the various devices, such as device A 130, device B 132 and device C, may also or instead include one or more wired networking interfaces such as, for example, 10-baseT specified in the IEEE 802.3 standard, 10/100 Ethernet, or Gigabit Ethernet (GbE or 1 GigE) as defined by the IEEE 802.3-2008 standard.

The intermediate router 118 may include, be part of, or be operably connected to devices such as a "smartphone," "tablet device," "television converter," "receiver," "set-top box," "television," "television receiver," "television recording device," "satellite set-top box," "satellite receiver," "cable set-top box," "cable receiver," "media player," "Internet streaming device" "mesh network node." and/or "television tuner." The computer intermediate router 118 may be any suitable device or electronic equipment that is operable to control, configure, provide network services to, provide network security to, and/or manage connected devices, such as device A 130, device B 132 and device C. Further, the intermediate router 118 may itself include user interface devices, such as buttons, switches and displays. In many applications, a remote-control device or mobile device (not shown) is operable to control the intermediate router 118, device A 130, device B 132 and/or device C.

Other examples of device A 130, device B 132 and/or device C include, but are not limited to: a Network Addressable Storage (NAS) device, a tablet computer, a smart phone, a printer, a television ("TV"), a personal computer ("PC"), a sound system receiver, a digital video recorder ("DVR"), game system, a presentation device, or the like. Presentation devices may employ a display, one or more speakers (not shown), and/or other output devices to communicate video and/or audio content to a user. In many implementations, one or more presentation devices reside in or near a customer's premises 116 and are communicatively coupled, directly or indirectly, to the intermediate router 118. Further, the intermediate router 118 and the presentation device may be integrated into a single device, such as a cellular telephone or other mobile device. Such a single device may have the functionality of the intermediate router 118 described herein and the presentation device, or may even have additional functionality.

Intermediate router 118 may be, enable and/or create a communication system or networked system, to which device A, device B, device C, router 136 and/or a variety of other auxiliary devices (collectively referred to herein as endpoint devices) are connected. Non-limiting examples of such a networked system or communication system include, but are not limited to, an Ethernet system, twisted pair Ethernet system, an intranet, a local area network ("LAN") system, short range wireless network (e.g., Bluetooth®), a personal area network (e.g., a ZigBee network based on the IEEE 802.15.4 specification), a Z-Wave® network, a Consumer Electronics Control (CEC) communication system or the like. One or more endpoint devices, such as IoT devices, PCs, data storage devices, TVs, game systems, sound system receivers, NAS devices, tablet computers, smart phones, printers or the like, may be communicatively coupled to the intermediate router 118 so that the plurality of endpoint devices are communicatively coupled together. Thus, such a network allows the interconnected endpoint devices, and the intermediate router 118, to communicate with each other directly and/or to other devices over the Internet 108 via router 136.

The above description of the customer premises 116, and the various devices therein, is intended as a broad, non-limiting overview of an example environment in which various embodiments of systems and methods for a computer network intermediate router may be implemented. The customer premises 116 and the various devices therein may contain other devices, systems and/or media not specifically described herein.

Example embodiments described herein provide applications, tools, data structures and other support to implement systems and methods for a computer network intermediate router. In the following description, numerous specific details are set forth, such as data formats, code sequences, and the like, in order to provide a thorough understanding of the described techniques. The embodiments described also can be practiced without some of the specific details described herein, or with other specific details, such as changes with respect to the ordering of the code flow, different code flows, and the like. Thus, the scope of the techniques and/or functions described are not limited by the particular order, selection, or decomposition of steps described with reference to any particular module, component, or routine.

Figure 2:
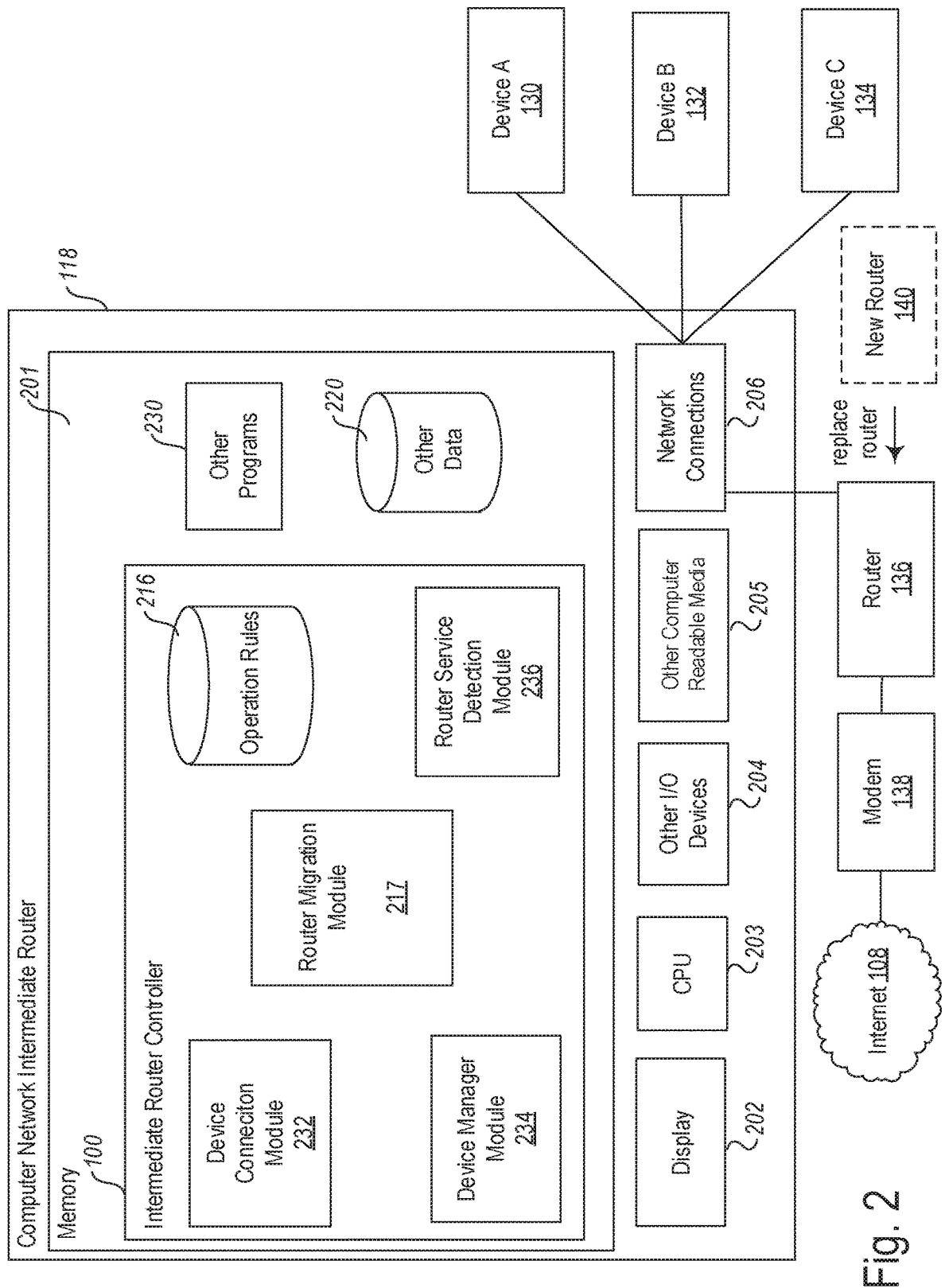
FIG. 2 is a block diagram illustrating elements of an example computer network intermediate router, according to one non-limiting embodiment.

FIG. 2 is a block diagram illustrating elements of an example computer network intermediate router 118, according to one non-limiting embodiment.

In one embodiment, intermediate router 118 is a computer network router configured to provide network routing and security services to network addressable devices operably connected to intermediate router 118, as shown in FIG. 2. In some embodiments, the intermediate router 118 is part of a presentation device, such as a smartphone, mobile device, other portable computing device, television and/or set-top box device. For example, components are shown of the intermediate router 118 that may be incorporated in a specialized device (e.g., a smartphone, mobile device, other portable computing device, television, set-top box device, specialized network device, server device, or other specialized computing device) on which the systems and methods described herein may operate or be implemented, according to various embodiments described herein. While intermediate router 118 configured as described herein is typically used to support the operation of the systems described herein, the system may be implemented using devices of various types and configurations and having various components which, when configured to perform the operations and processes described herein, are specialized non-generic devices. A hardware component such as a processor may also include programmable logic or circuitry that is temporarily configured by software to perform certain operations. For example, a hardware component may include software executed by a general-purpose processor or other programmable processor. Once configured by such software, hardware components become specific machines, or specific components of a machine, uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations.

Also, intermediate router 118 may operate on an open platform system or closed platform system. In a closed platform system, an entity providing the intermediate router 118, such as the home automation or data service provider has, via software and/or hardware security controls, control over all applications, content or media stored on the intermediate router 118, or otherwise restricts access to change the operation or configuration of the intermediate router 118. This is in contrast to an open platform, where end users and customers generally have unrestricted access to applications, content, configuration and operation of the computer network intermediate router. In either case, intermediate router 118 may be a device trusted by the other devices connected to the intermediate router 118, or have an increased trust level with respect to such devices, to facilitate the intermediate router 118 providing the network and security functions described herein.

In addition, in various embodiments, the intermediate router 118 may comprise one or more distinct computing systems/devices and may span distributed locations. Furthermore, each block shown may represent one or more such blocks as appropriate to a specific embodiment or may be combined with other blocks. Also, the intermediate router controller 100 of the intermediate router 118 may be implemented in software, hardware, firmware, or in some combination to achieve the capabilities described herein.

In the embodiment shown, intermediate router 118 comprises a computer memory ("memory") 201, a display 202, one or more Central Processing Units ("CPU") 203, Input/Output devices 204 (e.g., keyboard, mouse, RF or infrared receiver, light emitting diode (LED) panel or liquid crystal display (LCD), USB ports, other communication ports, and the like), other computer-readable media 205, and network connections 206. The operation rules stored in the operation rules store 216 and intermediate router controller 100 portions are shown residing in memory 201. In other embodiments, some portion of the contents, and some, or all, of the components of operation rules stored in the operation rules store 216 and intermediate router controller 100 may be stored on the other computer-readable media 205. The operation rules stored in the operation rules store 216 and intermediate router controller 100 components of the intermediate router 118 preferably execute on one or more CPUs 203 and facilitate the network, communication routing, router migration management, security services and other functionality as described herein. The intermediate router controller 100 also facilitates communication with peripheral devices and remote systems via the I/O devices 204 and network connections 206. For example, the intermediate router controller 100 may also interact via the Internet 108 with other devices and systems, which may be a system of an entity providing the intermediate router 118, such as a home automation or data service provider or the like.

According to one embodiment, intermediate router controller 100 provides a service to manage migration from one Internet router, such as router 136 to another Internet router. The router migration module 217 provides Internet connectivity to device A 130, device B 132 and device C 134 after the migration to the new router 140 replacing router 136 without reconnection, reactivation or reconfiguration of those devices during the migration. For example, despite that router 136 may become out of service during the migration, the router migration module 217 keeps each network connection from device A 130, device B 132 and device C 134 to the intermediate router 118 in a manner that is unaffected by router 136 being down or no longer existing, other than device A 130, device B 132 and device C 134 experiencing a temporary Internet service interruption until the new router 140 is in place.

In some embodiments, intermediate router 118 first connects to router 136 before device A 130, device B 132 and device C 134 are turned on or are otherwise active. Also, device A 130, device B 132 and device C 134 may connect to intermediate router 118 while router 136 is out of service or is turned off. Thus, device A 130, device B 132 and device C 134 connect to the intermediate router 118 and are configured by the device manager module 234 to be prevented from connecting to router 136 before any of those devices have an opportunity to connect to router 136. Device connection module 232, upon initial connection of device A 130, device B 132 and device C 134 to intermediate router 118, may send a signal, message, command or otherwise cause device A 130, device B 132 and device C 134 to not connect to, be pingable by, or otherwise be directly reachable by other devices or routers, unless and until allowed to do so by intermediate router 118. In one embodiment, this may be accomplished by intermediate router 118 sending a signal, message, command or otherwise causing device A 130, device B 132 and device C 134 to close all ports for incoming network requests from devices or routers other than intermediate router 118, unless and until they are allowed to be opened by intermediate router 118.

For example, upon initial connection to intermediate router 118, the device connection module 232 may send a signal, message, command or otherwise cause device A 130, device B 132 and device C 134 to use intermediate router 118 as the single access point to the Internet, and set the Internet Gateway of intermediate router 118 to the IP address of router 136. In some embodiments, device connection module 232 may disable automatic channel selection in one or both of intermediate router 118 and router 136 and set specific communication channels on intermediate router 118 and router 136 that do not conflict with each other. In various embodiments, continuing control by the intermediate router 118 of network communications for device A 130, device B 132 and device C 134 may be performed by the device manager module 234 at the physical, data link, network, transport, session, presentation, and/or application layer of the Open Systems Interconnection (OSI) network model.

The device manager module 234 receives outgoing Internet network communications from device A 130, device B 132 and device C 134 and routes the outgoing Internet network communications to router 136 via network connections 206. The device manager module 234 also receives, from the modem 138 via router 136, incoming Internet network communications addressed to the plurality of devices and routes the incoming Internet network communications to device A 130, device B 132 and device C 134. In some embodiments, the device manager module 234 may prevent the plurality of devices from connecting directly to router 136 (or any other router than intermediate router 118).

During migration to new router 140 that replaces router 136, the router service detection module 236 may receive an indication that router 136 is out of service or no longer exists. This may be due to the router service detection module 236 losing connection with router 136 as indicated by a lack of acknowledgement in response to a TCP/IP packet, a request timed out response, an unknown host response, a destination host unreachable response, or other lack of response to a TCP/IP, HTTP or other network connection request or ping command. Despite router 136 being out of service or no longer existing, the router migration module 217 keeps each network connection from device A 130, device B 132 and device C 134 to the intermediate router 118 in a manner that is unaffected by the router 136 being down or no longer existing (other than device A 130, device B 132 and device C 134 experiencing a temporary Internet service interruption).

The router migration module 217 then connects to the new wireless router to replace router 136 that is out of service or no longer exists. The router migration module 217 provides, via the connection to the new router 140, Internet connectivity to device A 130, device B 132 and device C 134 connected to the intermediate router 118 without reconnection, reactivation or reconfiguration of device A 130, device B 132 and device C 134 to obtain the Internet connectivity. In particular, device A 130, device B 132 and device C 134 may remain activated and configured to be connected to intermediate router 118, even during migration of router 136 to a new router 140. Thus, the migration to the new router 140 may include the router migration module 217 merely updating the Internet Gateway of intermediate router 118 to the IP address of the new router 140, rather than individually reconnecting, reactivating and reconfiguring device A 130, device B 132 and device C 134 to each connect to new router 140. Such network management, security and other functions may be performed based on a set of conditions or rules stored in operation rules 216 and/or in a remote storage system.

After migration to the new router 140 and providing, via the connection to the new router 140, Internet connectivity to device A 130, device B 132 and device C 134 without reconnection, reactivation or reconfiguration of those devices to obtain the Internet connectivity, device manager module 234 receives additional outgoing Internet network communications from device A 130, device B 132 and device C 134. Device manager module 234 then routes the additional outgoing Internet network communications to new router 140 that is connected to the modem 138 that provides the new router 140 access to the Internet 108.

Intermediate router 118 may also provide an interactive user interface to manage the networked devices connected to it, such as device A 130, device B 132 and device C, that is controlled by an interactive graphical user interface of a device that comprises or is in operable communication with the intermediate router 118 via network connections 206 and/or an interface of a remote control device is in operable communication with the intermediate router 118 via other I/O devices 204 (not shown). This interactive user interface may be communicated to and displayed on display 202 and/or a display of a device in operable communication with the intermediate router 118 (e.g., on a monitor and/or on a display of a mobile device) to enable the user to configure, control and manage the network connections to such devices via the device manager module 234 of the intermediate router 118.

The various rules of operations that implement the functionality of the intermediate router controller 100 described herein and selectable options of the intermediate router controller 100 may be stored in the operation rules store 216 and updated locally or remotely. Other code or programs 230 (e.g., routing or other network management software, and the like), and potentially other data repositories, such as other data store 220, which may store other network routing and management data, such as routing tables, also reside in the memory 201, and preferably execute on one or more CPUs 203. Of note, one or more of the components in FIG. 2 may not be present in any specific implementation. For example, some embodiments may not provide other computer-readable media 205 or a display 202.

In some embodiments, the intermediate router controller 100 includes an application program interface ("API") that provides programmatic access to one or more functions of the intermediate router controller 100. Such an API may provide a programmatic interface to one or more functions of the intermediate router controller 100 that may be invoked by one of the other programs 230 or some other module. In this manner, the API enables software, such as user interfaces, plug-ins and adapters to integrate functions of the intermediate router controller 100 into desktop computer or mobile device applications, and the like.

The API may be, in at least some embodiments, invoked or otherwise accessed via the intermediate router controller 100, or remote entities, to access various functions of the intermediate router controller 100. For example, a user may perform particular configurations of the intermediate router 118 or remotely control the intermediate router 118 via the API.

In an example embodiment, components/modules of the intermediate router controller 100 are implemented using standard programming techniques. For example, the operation rules stored in the operation rules store 216 and the various modules of the intermediate router controller 100 may be implemented as a "native" executable running on the CPU 203, along with one or more static or dynamic libraries. In other embodiments, the operation rules stored in the operation rules store 216 and the various modules of the intermediate router controller 100 may be implemented as instructions processed by a virtual machine that executes as one of the other programs 230. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), or declarative (e.g., SQL, Prolog, and the like).

In a software or firmware implementation, instructions stored in a memory configure, when executed, one or more processors of the intermediate router 118 to perform the functions of the intermediate router controller 100 described herein. In one embodiment, instructions cause the CPU 203 or some other processor, such as an I/O controller/processor, to perform operations described herein and implement the functionality of the intermediate router controller 100 described herein. Similarly, the CPU 203 or other processor may be configured to perform other operations such as to perform other network management, security and routing services.

The embodiments described above may also use well-known or other synchronous or asynchronous client-server computing techniques. However, the various components may be implemented using more monolithic programming techniques as well; for example, as an executable running on a single CPU computer system, or alternatively decomposed using a variety of structuring techniques known in the art, including but not limited to, multiprogramming, multithreading, client-server, or peer-to-peer, and running on one or more computer systems each having one or more CPUs. Some embodiments may execute concurrently and asynchronously, and communicate using message passing techniques. Equivalent synchronous embodiments are also supported by an intermediate router controller 100 implementation. Also, other functions could be implemented and/or performed by each component/module, and in different orders, and by different components/modules, yet still achieve the functions of the intermediate router controller 100.

In addition, programming interfaces to the data stored as part of the intermediate router controller 100, can be available by standard mechanisms such as through C, C++, C#, and Java APIs; libraries for accessing files, databases, or other data repositories; scripting languages such as XML; or Web servers, FTP servers, or other types of servers providing access to stored data. The operation rules store 216 and other data store 220 may be implemented as one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the illustrated embodiments in a distributed manner including but not limited to TCP/IP sockets, remote procedure call (RPC), remote method invocation (RMI), HTTP, and Web Services (XML-RPC, JAX-RPC, SOAP, and the like). Other variations are possible. Other functionality could also be provided by each component/module, or existing functionality could be distributed amongst the components/modules in different ways, yet still achieve the functions of the intermediate router controller 100.

Furthermore, in some embodiments, some or all of the components of the intermediate router controller 100 may be implemented or provided in other manners, such as at least partially in firmware and/or hardware, including, but not limited to one or more application-specific integrated circuits ("ASICs"), standard integrated circuits, controllers (e.g., by executing appropriate instructions and including microcontrollers and/or embedded controllers), field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; or other non-transitory computer-readable storage medium to be read by an appropriate drive or via an appropriate connection, such as a DVD, random access memory (RAM) or flash memory device) so as to enable or configure the computer-readable medium and/or one or more associated computing systems or devices to execute or otherwise use or provide the contents to perform at least some of the described techniques. A transitory computer-readable medium as used herein means a signal transmission itself (for example, a propagating electrical or electromagnetic signal itself) and not the hardware medium on which information is stored. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

Figure 3:
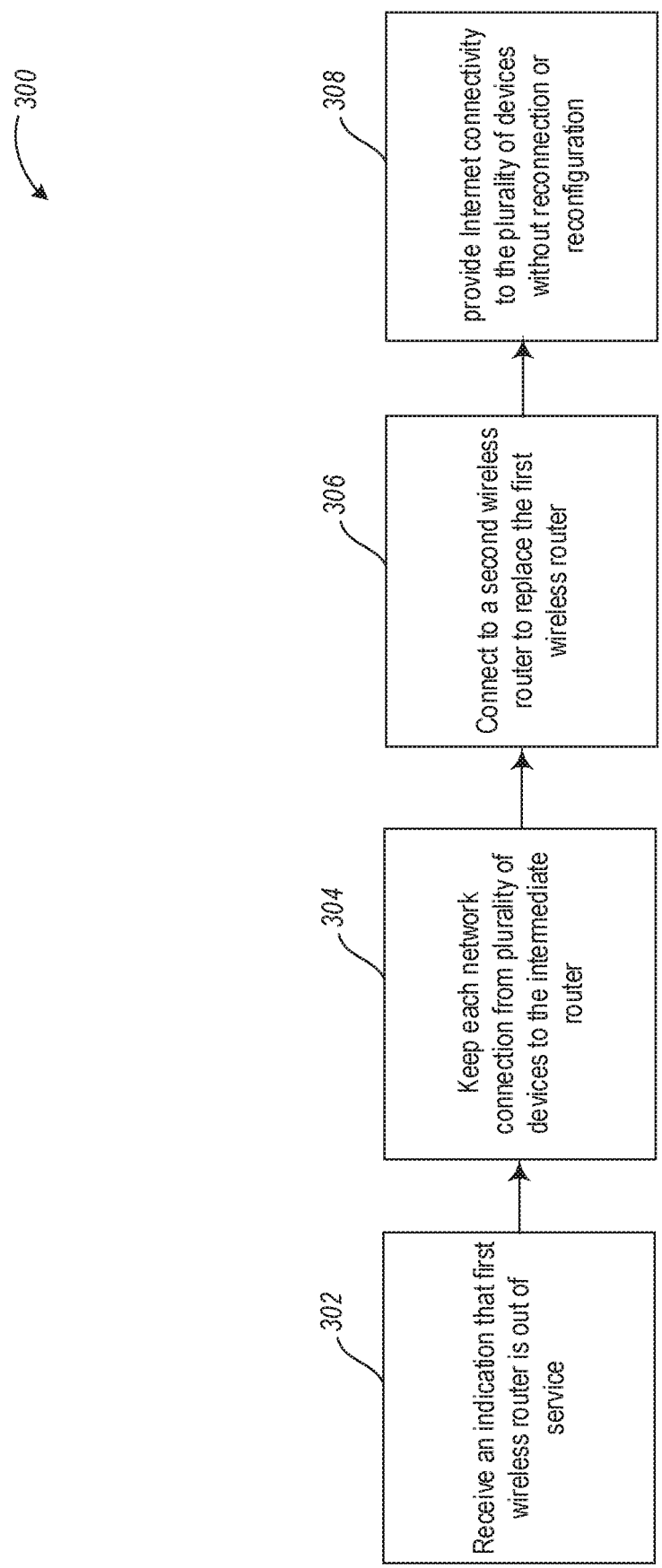
FIG. 3 is a flow diagram of an example method for switching to a new router using an intermediate router, according to one non-limiting embodiment.

FIG. 3 is a flow diagram of an example method 300 for switching to a new router using an intermediate router, according to one non-limiting embodiment.

At 302, an intermediate router, such as, for example, intermediate router 118 shown in FIG. 1, receives an indication that a first wireless router, such as router 136 to which the intermediate router is connected is out of service or no longer exists. The first wireless router provided Internet connectivity to the intermediate router, which in turn provided Internet connectivity to a plurality of devices, such as device A 130, device B 132 and device C 134, connected to intermediate router 118.

At 304, despite that the first wireless router is out of service or no longer exists, the intermediate router keeps each network connection from the plurality of devices to the intermediate router in a manner that is unaffected by the first wireless router being down or no longer existing, other than the plurality of devices experiencing a temporary Internet service interruption.

At 306, the intermediate router connects to a second wireless router, such as new router 140, to replace the first wireless router that is out of service or no longer exists.

At 308, the intermediate router provides, via the connection to the second wireless router, Internet connectivity to the plurality of devices connected to the intermediate router without reconnection, reactivation or reconfiguration of the plurality of devices to obtain the Internet connectivity.

Figure 4:
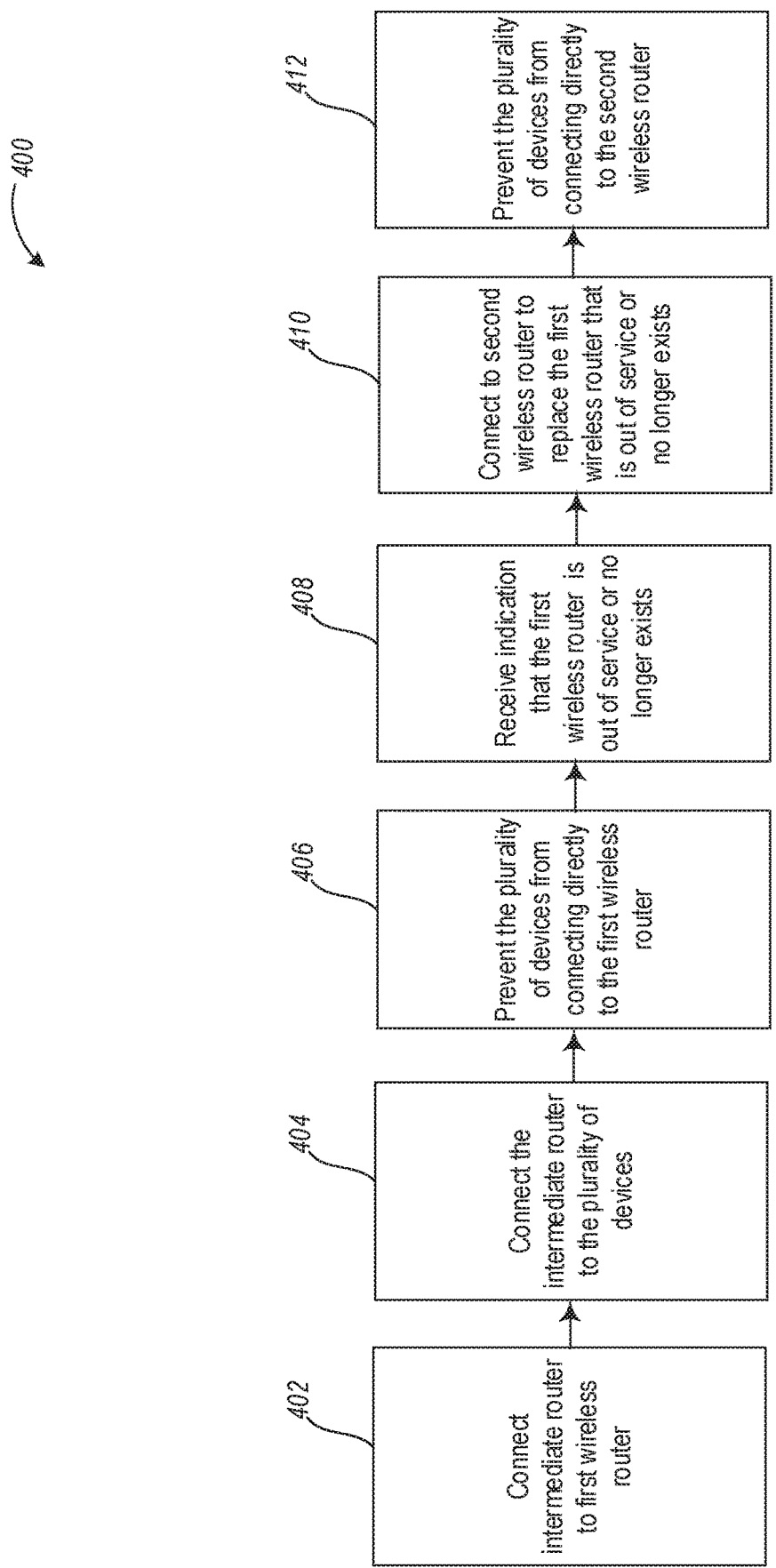
FIG. 4 is a flow diagram of an example method for connecting to an intermediate router and switching to a new router using the intermediate router, according to one non-limiting embodiment.

FIG. 4 is a flow diagram of an example method 400 for connecting to an intermediate router and switching to a new router using the intermediate router, according to one non-limiting embodiment.

At 402, an intermediate router such as, for example, intermediate router 118 shown in FIG. 1, connects to a first wireless router, such as, for example, router 136 of FIG. 1, before any of a plurality of devices connects to the first wireless router. For example, the plurality of devices may be device A 130, device B 132 and device C 134 of FIG. 1. In one embodiment, the plurality of devices may be turned off or otherwise inactive while the intermediate router connects to a first wireless router.

At 404, the intermediate router connects to the plurality of devices before any of the plurality of devices connects to the first wireless router.

At 406, the intermediate router then prevents the plurality of devices from connecting directly to the first wireless router. The first wireless router provides Internet connectivity to the intermediate router, which in turn provides Internet connectivity to the plurality of devices connected to the intermediate router.

At 408, the intermediate router receives an indication that the first wireless router to which the intermediate router is connected is out of service or no longer exists.

At 410, the intermediate router connects to a second wireless router, such as, for example, new router 140 of FIG. 1, to replace the first wireless router that is out of service or no longer exists.

At 412, before the providing of Internet connectivity, via the connection to the second wireless router, to the plurality of devices connected to the intermediate router, the intermediate router prevents the plurality of devices from connecting directly to the second wireless router.

Figure 5:
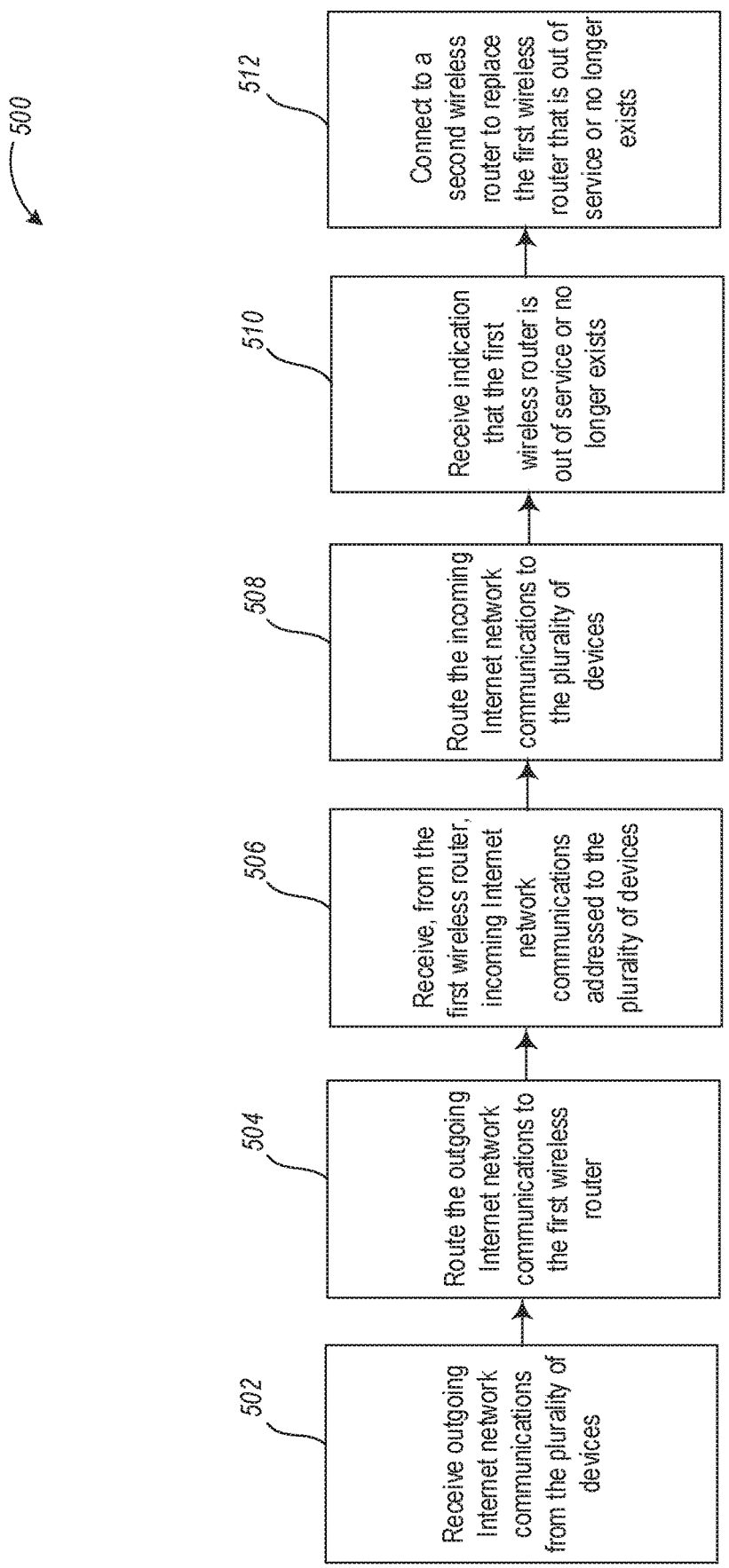
FIG. 5 is a flow diagram of an example method for routing network communications and switching to a new router using an intermediate router, according to one non-limiting embodiment.

FIG. 5 is a flow diagram of an example method 500 for routing network communications and switching to a new router using an intermediate router, according to one non-limiting embodiment.

At 502, an intermediate router, such as, for example, intermediate router 118 of FIG. 1, receives outgoing Internet network communications from a plurality of devices, such as, for example, device A 130, device B 132 and device C 134 of FIG. 1.

At 504, the intermediate router 118 routes the outgoing Internet network communications to a first wireless router, such for example, router 136 of FIG. 1, which is connected to a modem, such as, for example, modem 138 of FIG. 1, that provides Internet connectivity to the first wireless router.

At 506, the intermediate router receives, from the modem via the first wireless router, incoming Internet network communications addressed to the plurality of devices.

At 508, the intermediate router routes the incoming Internet network communications to the plurality of devices.

At 510, the intermediate router receives an indication that the first wireless router to which the intermediate router is connected is out of service or no longer exists.

At 512, the intermediate router connects to a second wireless router, such as, for example, new router 140 of FIG. 1, to replace the first wireless router that is out of service or no longer exists.

As used herein, a "component" may refer to a device, physical entity or logic having boundaries defined by function or subroutine calls, branch points, application programming interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components.

Where a phrase similar to "at least one of A, B, or C," "at least one of A, B, and C," "one or more A, B, or C," or "one or more of A, B, and C" is used, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A computer network intermediate router, comprising:
at least one processor; and
at least one memory coupled to the at least one processor, wherein the at least one memory has computer-executable instructions stored thereon that, when executed by the at least one processor, cause the at least one processor to:
receive an indication that a first wireless router to which the intermediate router is connected is out of service or no longer exists, wherein the first wireless router provided Internet connectivity to the intermediate router, which in turn provided Internet connectivity to a plurality of devices connected to the intermediate router;
before receiving the indication that the first wireless router to which the intermediate router is connected is out of service or no longer exists, connect to the first wireless router before any of the plurality of devices connects to the first wireless router;
despite that the first wireless router is out of service or no longer exists, keep each network connection from the plurality of devices to the intermediate router in a manner that is unaffected by the first wireless router being down or no longer existing, other than the plurality of devices experiencing a temporary Internet service interruption;
connect to a second wireless router to replace the first wireless router that is out of service or no longer exists; and
provide, via the connection to the second wireless router, Internet connectivity to the plurality of devices connected to the intermediate router without reconnection, reactivation or reconfiguration of the plurality of devices to obtain the Internet connectivity.

2. A computer network intermediate router, comprising:
at least one processor; and
at least one memory coupled to the at least one processor, wherein the at least one memory has computer-executable instructions stored thereon that, when executed by the at least one processor, cause the at least one processor to:
receive an indication that a first wireless router to which the intermediate router is connected is out of service or no longer exists, wherein the first wireless router provided Internet connectivity to the intermediate router, which in turn provided Internet connectivity to a plurality of devices connected to the intermediate router;
before receiving the indication that the first wireless router to which the intermediate router is connected is out of service or no longer exists, connect to the plurality of devices before any of the plurality of devices connects to the first wireless router;
despite that the first wireless router is out of service or no longer exists, keep each network connection from the plurality of devices to the intermediate router in a manner that is unaffected by the first wireless router being down or no longer existing, other than the plurality of devices experiencing a temporary Internet service interruption;
connect to a second wireless router to replace the first wireless router that is out of service or no longer exists; and
provide, via the connection to the second wireless router, Internet connectivity to the plurality of devices connected to the intermediate router without reconnection, reactivation or reconfiguration of the plurality of devices to obtain the Internet connectivity.

3. A computer network intermediate router, comprising:
at least one processor; and
at least one memory coupled to the at least one processor, wherein the at least one memory has computer-executable instructions stored thereon that, when executed by the at least one processor, cause the at least one processor to:
receive an indication that a first wireless router to which the intermediate router is connected is out of service or no longer exists, wherein the first wireless router provided Internet connectivity to the intermediate router, which in turn provided Internet connectivity to a plurality of devices connected to the intermediate router;
before receiving the indication that the first wireless router to which the intermediate router is connected is out of service or no longer exists, prevent the plurality of devices from connecting directly to the first wireless router;
despite that the first wireless router is out of service or no longer exists, keep each network connection from the plurality of devices to the intermediate router in a manner that is unaffected by the first wireless router being down or no longer existing, other than the plurality of devices experiencing a temporary Internet service interruption;
connect to a second wireless router to replace the first wireless router that is out of service or no longer exists;
provide, via the connection to the second wireless router, Internet connectivity to the plurality of devices connected to the intermediate router without reconnection, reactivation or reconfiguration of the plurality of devices to obtain the Internet connectivity; and before the providing of Internet connectivity, via the connection to the second wireless router, to the plurality of devices connected to the intermediate router, prevent the plurality of devices from connecting directly to the second wireless router.

4. A computerized method for a computer network intermediate router, the method comprising:

receiving, by the intermediate router, an indication that a first wireless router to which the intermediate router is connected is out of service or no longer exists, wherein the first wireless router provided Internet connectivity to the intermediate router, which in turn provided Internet connectivity to a plurality of devices connected to the intermediate router;

before receiving the indication that the first wireless router to which the intermediate router is connected is out of service or no longer exists, connecting, by the intermediate router, to the first wireless router before any of the plurality of devices connect to the first wireless router;

despite that the first wireless router is out of service or no longer exists, keeping, by the intermediate router, each network connection from the plurality of devices to the intermediate router in a manner that is unaffected by the first wireless router being down or no longer existing, other than the plurality of devices experiencing a temporary Internet service interruption;

connecting, by the intermediate router, to a second wireless router to replace the first wireless router that is out of service or no longer exists; and providing, by the intermediate router, via the connection to the second wireless router, Internet connectivity to the plurality of devices connected to the intermediate router without reconnection, reactivation or reconfiguration of the plurality of devices to obtain the Internet connectivity.

5. A non-transitory computer-readable medium having computer-executable instructions stored thereon that, when executed by at least one processor, cause the at least one processor to;

receive, by a computer network intermediate router, an indication that a first wireless router to which the intermediate router is connected is out of service or no longer exists, wherein the first wireless router provided Internet connectivity to the intermediate router, which in turn provided Internet connectivity to a plurality of devices connected to the intermediate router;

before receiving the indication that the first wireless router to which the intermediate router is connected is out of service or no longer exists, connect, by the intermediate router, to the first wireless router before any of the plurality of devices connect to the first wireless router;

despite that the first wireless router is out of service or no longer exists, keep, by the intermediate router, each network connection from the plurality of devices to the intermediate router in a manner that is unaffected by the first wireless router being down or no longer existing, other than the plurality of devices experiencing a temporary Internet service interruption;

connect, by the intermediate router, to a second wireless router to replace the first wireless router that is out of service or no longer exists; and provide, by the intermediate router, via the connection to the second wireless router, Internet connectivity to the plurality of devices connected to the intermediate router without reconnection, reactivation or reconfiguration of the plurality of devices to obtain the Internet connectivity.

6. A non-transitory computer-readable medium having computer-executable instructions stored thereon that, when executed by at least one processor, cause the at least one processor to:

receive, by a computer network intermediate router, an indication that a first wireless router to which the intermediate router is connected is out of service or no longer exists, wherein the first wireless router provided Internet connectivity to the intermediate router, which in turn provided Internet connectivity to a plurality of devices connected to the intermediate router;

before receiving the indication that the first wireless router to which the intermediate router is connected is out of service or no longer exists, connect, by the intermediate router, to the plurality of devices before any of the plurality of devices connect to the first wireless router;

despite that the first wireless router is out of service or no longer exists, keep, by the intermediate router, each network connection from the plurality of devices to the intermediate router in a manner that is unaffected by the first wireless router being down or no longer existing, other than the plurality of devices experiencing a temporary Internet service interruption;

connect, by the intermediate router, to a second wireless router to replace the first wireless router that is out of service or no longer exists; and provide, by the intermediate router, via the connection to the second wireless router, Internet connectivity to the plurality of devices connected to the intermediate router without reconnection, reactivation or reconfiguration of the plurality of devices to obtain the Internet connectivity.

7. A non-transitory computer-readable medium having computer-executable instructions stored thereon that, when executed by at least one processor, cause the at least one processor to:

receive, by a computer network intermediate router, an indication that a first wireless router to which the intermediate router is connected is out of service or no longer exists, wherein the first wireless router provided Internet connectivity to the intermediate router, which in turn provided Internet connectivity to a plurality of devices connected to the intermediate router;

before receiving the indication that the first wireless router to which the intermediate router is connected is out of service or no longer exists, prevent, by the intermediate router, the plurality of devices from connecting directly to the first wireless router;

despite that the first wireless router is out of service or no longer exists, keep, by the intermediate router, each network connection from the plurality of devices to the intermediate router in a manner that is unaffected by the first wireless router being down or no longer existing, other than the plurality of devices experiencing a temporary Internet service interruption;

connect, by the intermediate router, to a second wireless router to replace the first wireless router that is out of service or no longer exists;

before connecting to the second wireless router to replace the first wireless router that is out of service or no longer exists, prevent, by the intermediate router, the plurality of devices from connecting directly to the second wireless router; and provide, by the intermediate router, via the connection to the second wireless router, Internet connectivity to the plurality of devices connected to the intermediate router without reconnection, reactivation or reconfiguration of the plurality of devices to obtain the Internet connectivity.

\* \* \* \* \*